(12) United States Patent
Hedges et al.

(10) Patent No.: US 10,856,402 B2
(45) Date of Patent: Dec. 1, 2020

(54) SUPERCONDUCTING RESONATING CAVITY WITH LASER WELDED SEAM AND METHOD OF FORMATION THEREOF

(71) Applicant: II-VI Delaware, Inc., Wilmington, DE (US)

(72) Inventors: Alan Hedges, Allison Park, PA (US); Kyle Branigan, Pittsburgh, PA (US)

(73) Assignee: II-VI Delaware, Inc., Wilmington, DE (US)

( * ) Notice: Subject to any disclaimer, the term of this patent is extended or adjusted under 35 U.S.C. 154(b) by 109 days.

(21) Appl. No.: 16/018,729

(22) Filed: Jun. 26, 2018

(65) Prior Publication Data
US 2019/0357344 A1 Nov. 21, 2019

Related U.S. Application Data

(63) Continuation-in-part of application No. 15/983,340, filed on May 18, 2018.

(51) Int. Cl.
| | |
|---|---|
| *H05H 7/20* | (2006.01) |
| *H01P 7/06* | (2006.01) |
| *B23K 26/282* | (2014.01) |
| *H01P 11/00* | (2006.01) |

(Continued)

(52) U.S. Cl.
CPC .............. *H05H 7/20* (2013.01); *B23K 26/282* (2015.10); *H01P 7/06* (2013.01); *H01P 11/008* (2013.01); *B23K 2101/36* (2018.08); *B23K 2103/50* (2018.08)

(58) Field of Classification Search
CPC .... H05H 7/18; H05H 7/20; H01P 7/06; H01P 1/208
See application file for complete search history.

(56) References Cited

U.S. PATENT DOCUMENTS

| | | | | |
|---|---|---|---|---|
| 5,239,157 A | * | 8/1993 | Sakano | ..................... H05H 7/20 219/121.64 |
| 5,347,242 A | * | 9/1994 | Shimano | ................... H05H 7/20 315/5.41 |
| 6,097,153 A | | 8/2000 | Brawley et al. | |

(Continued)

OTHER PUBLICATIONS

F. Furuta et al., Experimental Comparison at KEK of High Gradient Performance of Different Single Cell Superconducting Cavity Design., EPAC 2006, MOPLS084, pp. 1-10.

(Continued)

*Primary Examiner* — Dean O Takaoka
*Assistant Examiner* — Alan Wong
(74) *Attorney, Agent, or Firm* — Blank Rome LLP

(57) ABSTRACT

A superconducting radio frequency cell includes a body defining a hollow cavity having a first iris and second iris at opposite ends of the body, an axis that extends between the first and second irises, and an equator around the axis between the first and second irises. The body includes at least a first weld seam around the axis at a location on the body spaced from the equator. Each weld seam extends through the body and has opposite sides terminating proximate an interior and an exterior of the body, and each weld seam includes a first, conduction weld formed on one side of the weld seam and a second weld formed on the opposite side of the weld seam. The second weld can be a conduction weld, a keyhole weld, or a transition weld.

18 Claims, 17 Drawing Sheets

(51) Int. Cl.
 *B23K 103/00* (2006.01)
 *B23K 101/36* (2006.01)

(56) References Cited

U.S. PATENT DOCUMENTS

| | | | |
|---|---|---|---|
| 8,042,258 B2 | 10/2011 | Sennyu et al. | |
| 8,088,714 B2 | 1/2012 | Singer et al. | |
| 8,630,689 B2 * | 1/2014 | Sennyu | H05H 7/20 505/200 |
| 8,872,446 B2 * | 10/2014 | Tsubota | H05H 7/22 315/501 |
| 8,951,936 B2 * | 2/2015 | Sennyu | B23K 26/1224 505/480 |
| 9,352,416 B2 * | 5/2016 | Khare | B23K 26/0823 |
| 2018/0027644 A1 | 1/2018 | Cooley | |

OTHER PUBLICATIONS

Wikipedia, Superconducting radio frequency, https://en.wikipedia.org/w/index.php?title=Superconducting_radio_frequency&oldid=793799959, Aug. 4, 2017.
Hasan Padamsee, RF Superconductivity Science, Technology, and Applications, 2009 Wiley-VCH Verlag GmbH & Co. KGaA, pp. 12-21.

* cited by examiner

SUPERCONDUCTING RESONATING CAVITY WITH LASER WELDED SEAM AND METHOD OF FORMATION THEREOF

CROSS-REFERENCE TO RELATED APPLICATION

This application is a continuation-in-part of U.S. patent application Ser. No. 15/983,340, filed May 18, 2018, titled "Superconducting Resonating Cavity and Method of Production Thereof".

BACKGROUND OF THE INVENTION

Field of the Invention

The present invention relates to superconducting radio frequency (SRF) cells, methods of producing SRF cells, a weld seam that can be used with an SRF cell or other objects, and a method of forming the weld seam.

Description of Related Art

RF cavities are used to accelerate groups of charged particles towards a target. For many applications, the benefits of using cavities with superconducting internal surfaces outweigh the increased costs associated with cooling the cavities to cryogenic temperatures. The cavities are judged by their quality factor and acceleration gradient. Quality factor ($Q_0$) gives the inverse of the amount of energy lost in each cycle of the system. High quality factors reduce operating costs by requiring less cryogenic cooling. The acceleration gradient of the cavity describes its ability to accelerate particles. Acceleration gradients for superconducting RF (SRF) cavities are usually given in millions of volts/meter. Higher gradients require fewer cavities to run a system at the same accelerating field, reducing start-up and operating costs. However, higher gradients require higher internal fields, pushing the performance limits for the superconducting interior surfaces.

SRF cavities are limited by any factor which causes a breakdown in the superconducting field. Commonly this transition out of the superconducting state is referred to as a "quench". High voltages along the interior of the cavity can cause electrons to be emitted from the surface, producing X-rays and heating the cavity. This is commonly known as field emission. High intensity magnetic fields around the equator of a cavity can reach a level that exceeds the critical magnetic field of the niobium used to form the cavity or a coating of an interior of the cavity. Exceeding the critical magnetic field of the niobium breaks down the superconducting state and causes a quench. Moreover, variations in the surface can increase the amount of magnetic field to which the surface of the cavity is exposed, leading to a premature quench. The increase in the magnetic flux experienced by the cavity due to these variations is known as field enhancement.

For maximum quality factors and acceleration gradients in a given cavity, the interior surface of the cavity is desirably smooth, clean, and uninterrupted. Even microscopic contaminants in the surface break down the superconducting state by exposing non-superconducting phases to high RF fields. Impurities can act as points of field emission due to their concentration of the electric field, Surface roughness in areas of high magnetic field can cause an enhancement of the local magnetic, field to a level beyond the critical value of the niobium which can lead to a breakdown in the superconducting state. Surface roughness in areas of high electric field can cause field emission, heating the surface and causing a breakdown in the superconducting state.

Developments in the field of SRF cavity manufacture have largely eliminated the failure of cavities due to contamination and field emission. The limitations of $Q_0$ and accelerating gradient are largely due to exceeding the critical magnetic field at the equator of the cavity. The critical magnetic field is the field at which the cavity begins to transition out of its superconducting state.

The design of cavities to-date places the greatest magnetic field along the 'equator' of the cavity where first- and second-half cells forming the cavity are joined together by a weld seam, sometimes called an "equatorial weld seam". The shape of the cavities can also be adjusted to optimize different performance characteristics.

The welding of niobium for SRF cavities is currently a "blind" process where the weld along the equator is done in a vacuum with an electron beam oscillated around the exterior of the cell equator. This process, while well studied and controlled, still gives inconsistent results. Post-processing of the surface is limited to "grinder-on-a-stick" and "camera-on-a-stick" inspection before chemical etching of the weld.

With reference to FIG. 15, in one preferred and non-limiting embodiment or example, a single superconducting radio frequency (SRF) cavity 2 sometimes includes a number of superconducting cells 4 connected in series. The example SRF cavity 2 shown in FIG. 15 includes nine cells 4 connected in series between an input end 6 and an output end 8. In an example, input end 6 is configured to be coupled to a source of RF energy which produces in SRF cavity 2 a standing wave that can be used to accelerate particles from input end 6 through cavity 2 and exiting output end 8 which may be connected to another SRF cavity (not shown). In an example, RF energy is input into SRF cavity 2 via an RF input port 7 coupled to SRF cavity 2 at input end 6.

With reference to FIG. 16 and with continuing reference to FIG. 15, in one preferred and non-limiting embodiment or example, more specifically, RF electrical energy received at RF input port 7 produces within each cell 4 electric and magnetic fields which can be used to accelerate particles (e.g., a particle beam) along an axis 20 of SRF cell 4. The example cell 4 shown in FIG. 16 defines an equator 10 and irises 12-1 and 12-2 on opposite ends of cell 4. As would be appreciated by one skilled in the art, in use, SRF cavities 2 are typically cooled to superconducting temperatures inside of a suitable vessel 13 (FIG. 15).

With reference to FIG. 17 and with continuing reference to FIGS. 15 and 16, in one preferred and non-limiting embodiment or example, a prior art cell 4 is formed from a first-half cell 14 and a second-half cell 16 (which can be identical to first-half cell 14) that are joined together by welding the outsides or exteriors of first- and second-half cell 14, 16 to form cell 4. The weld seam (or weld circle) where first-half cell 14 and second-half cell 16 are welded defines an equator 18 of cell 4. Finally, half cells 14 and 16 include irises 12-1 and 12-2, respectively, which, when half-cells 14 and 16 are joined together, define the equator 18 of cell 4 one-half of the distance between irises 12-1 and 12-2 of cell 4. In an example, irises 12-1 and 12-2 are spaced apart distance X and equator 18 is positioned distances Y1 and Y2 from irises 12-1 and 12-2, respectively. Distances Y1 and Y2 can be the same distance.

In one preferred and non-limiting embodiment or example, in similarity to an equator of a sphere or planet (such as the earth), equator 18 is a line of latitude, or circle of latitude, that is halfway between irises 12-1 and 12-2 which, in analogy to a sphere or planet, correspond to the north and south poles of said sphere or planet. In similarity to the equator of a sphere or planet dividing the surface into northern and southern hemispheres, equator 18 of cell 4 is the dividing line between first half-cell 14 and second half-cell 16. In an example, equator 18 of cell 4 is at the 0° latitude of cell 4. Finally, cell 4 defines an axis 20 that, in an example, defines an axis of symmetry, e.g., a rotational axis of symmetry, of cell 4 that runs between the centers of irises 12-1 and 12-2.

It would be desirable to provide a SRF cavity and method of producing a SRF cavity having improved performance over existing SRF cavity designs that, in use, experience the highest intensity magnetic fields near their equator.

SUMMARY OF THE INVENTION

Generally, provided is a method of forming niobium superconducting radio frequency (SRF) cells with weld seams relocated to less performance critical areas of the superconducting (interior) surface of the cell. This relocation can enable better treatment of the inner surface of the cell's equator.

Also provided is an improved weld seam, an SRF cell having an improved weld seam, and a method of forming the improved weld seam.

BRIEF DESCRIPTION OF THE DRAWINGS

These and other features of the present invention will become more apparent from the following description in which reference is made to the appended drawings wherein.

DESCRIPTION OF THE INVENTION

Figure 1:
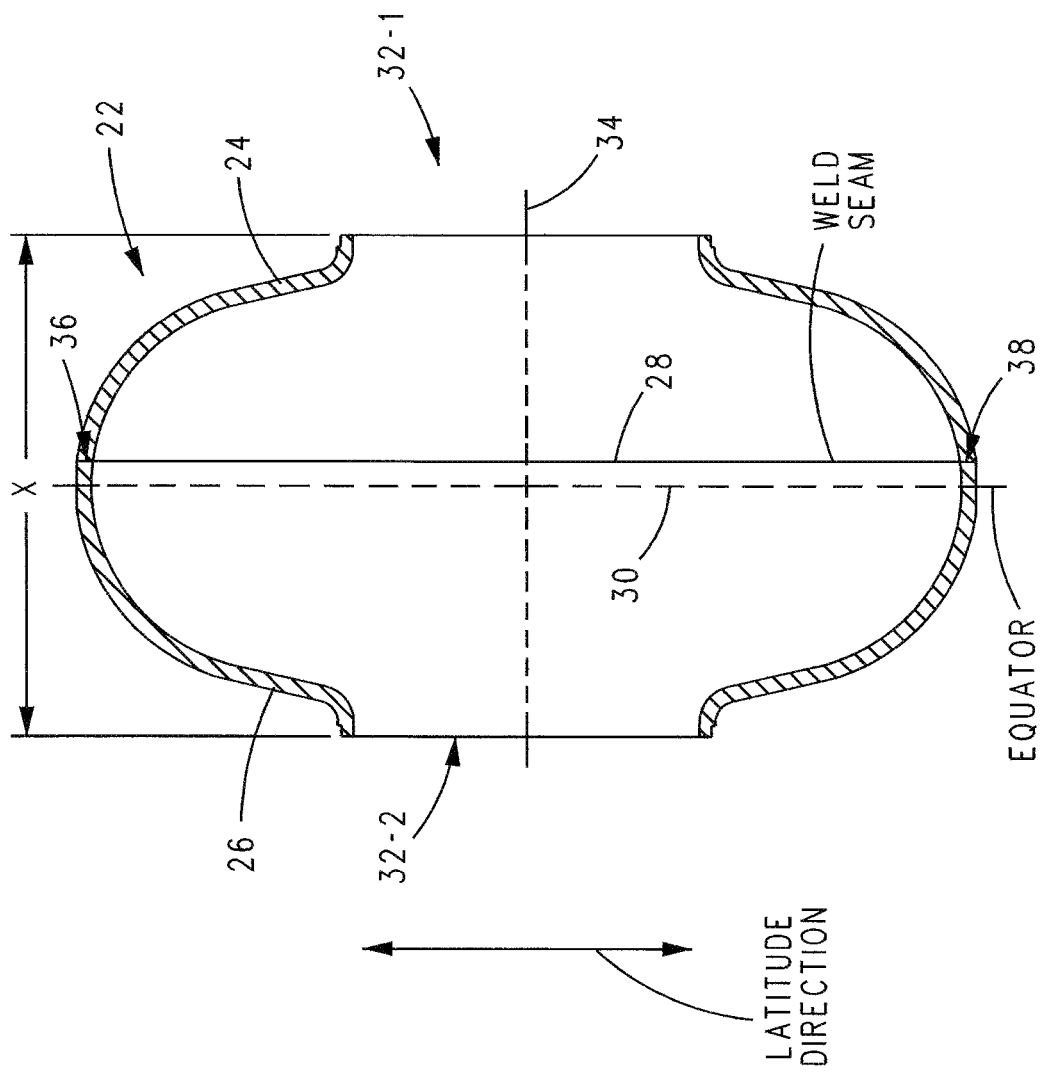
FIG. 1 is a cross-section of one preferred and non-limiting embodiment or example SRF cell according to the principles of the present invention.

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

The Background having thus described a prior art cell 4 and a SRF cavity 2 where one or a number of said cells 4 are used, the following description will describe examples of cells in accordance with some preferred and non-limiting embodiments or examples in accordance with the principles of the present invention.

In one preferred and non-limiting embodiment or example, the cross-sections of the cells shown in the various figures are TESLA-shaped. However, this is not to be construed in a limiting sense since use of the present invention in connection with other shaped cells is envisioned. Examples of other shaped cells include a Low Loss-shape and a Reentrant-shape.

With reference to FIG. 1, in one preferred and non-limiting embodiment or example, a cell 22 that can be used in place of a cell 4 includes a first partial cell 24 and a second partial cell 26 that are joined together at a weld seam 28 at a latitude other than an equator 30 of cell 22. Cell 22 includes irises 32-1 and 32-2 defined by first partial cell 24 and second partial cell 26, respectively. Cell 22 can include an axis 34, which can be an axis of symmetry, e.g., a rotational axis of symmetry, that runs between irises 32-1 and 32-2 spaced apart distance X. In an example, axis 34 runs through the centers of irises 32-1 and 32-2.

In one preferred and non-limiting embodiment or example, first partial cell 24 and second partial cell 26 can have different shapes/sizes. For example, the distance from iris 32-2 of second partial cell 26 to weld seam 28 can be greater than the distance of iris 32-1 of first partial cell 24 to weld seam 28. In one preferred and non-limiting embodiment or example, each cell 24, 26 can be made from niobium.

In one preferred and non-limiting embodiment or example, each iris described herein can be circular. However, this is not to be construed in a limiting sense. Moreover, herein, each reference to a distance or location of a weld seam from another element is to be understood as the center of the weld seam from said element. This is because, in practice, each weld seam can have a width (as measured in a direction of axis 34) that is formed during the welding operation, wherein said width can vary within a single weld seam or between different weld seams depending on welding conditions at the time each weld seam or portion thereof is formed.

In one preferred and non-limiting embodiment or example, the weld seam 28 of cell 22 shown in FIG. 1 is located in a direction along axis 34 towards iris 32-1 at least 5 mm from equator 30, which, in this example, is not a weld seam. Weld seam 28 is formed by welding a first cell welding edge 36 of first partial cell 24 to a second cell welding edge 38 of second partial cell 26. In other words, weld seam 28 is formed by welding first cell welding edge 36 and second cell welding edge 38 together.

Figure 2:
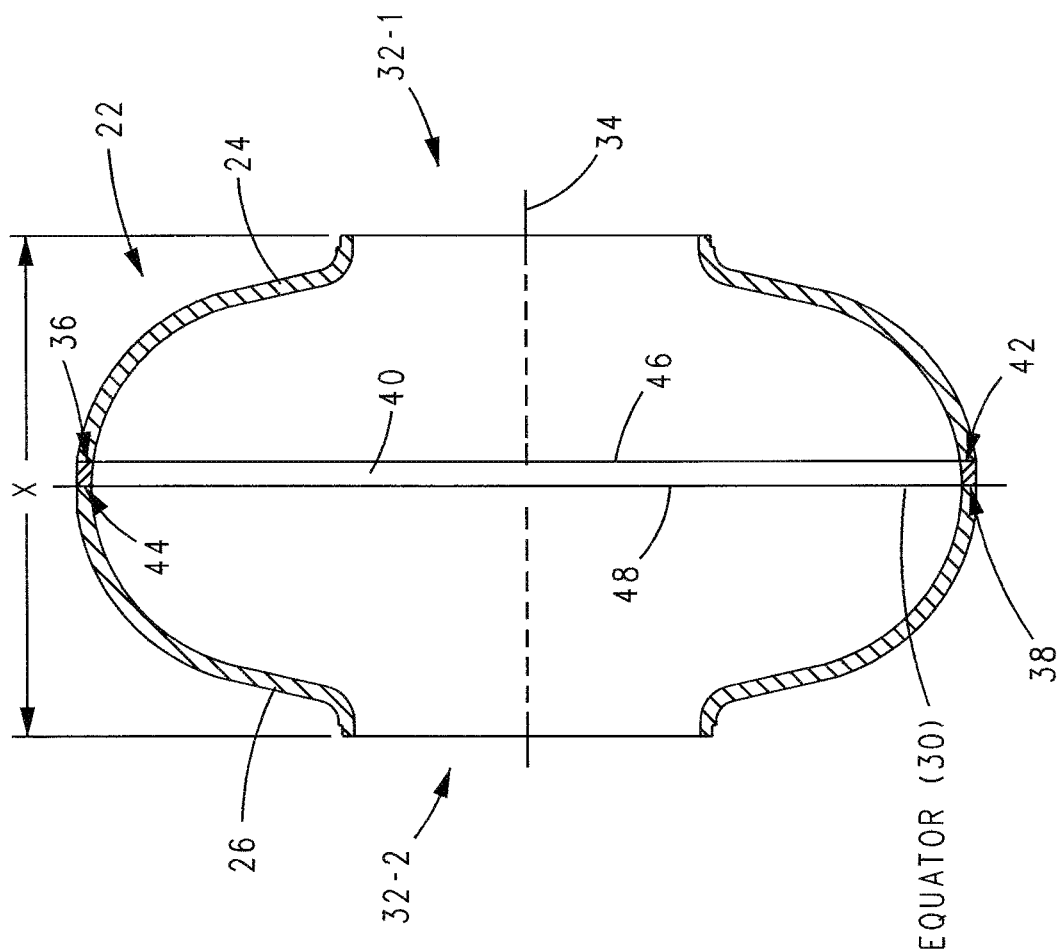
FIG. 2 is a cross-section of one preferred and non-limiting embodiment or example SRF cell according to the principles of the present invention.

With reference to FIG. 2 and with continuing reference to FIG. 1, in one preferred and non-limiting embodiment or example, another example cell 22 can include first partial cell 24 including first cell welding edge 36 and second partial cell 26 including second partial welding cell edge 38. Positioned between first and second partial cells 24 and 26 is a pipe section 40 that includes a first pipe welding edge 42 and a second pipe welding edge 44 facing the respective first cell welding edge 36 and second cell welding edge 38.

In one preferred and non-limiting embodiment or example, to complete the formation of cell 22 shown in FIG. 2, the first cell welding edge 36 is welded to the first pipe welding edge 42 to form a first weld seam 46 and the second cell welding edge 38 is welded to the second pipe welding edge 44 to form a second weld seam 48, The order of forming first weld seam 46 and second weld seam 48 is not to be construed in a limiting sense.

In one preferred and non-limiting embodiment or example, second weld seam 48 can be positioned on equator 30 of cell 22 positioned at a 0° latitude coordinate of the body of cell 22 between irises 32-1 and 32-2. First weld seam 46 can be formed at a latitude other than equator 30. In an example, first weld seam 46 can be located in a direction along axis 34 toward iris 32-1 at least 5 mm from equator 30.

Figure 3:
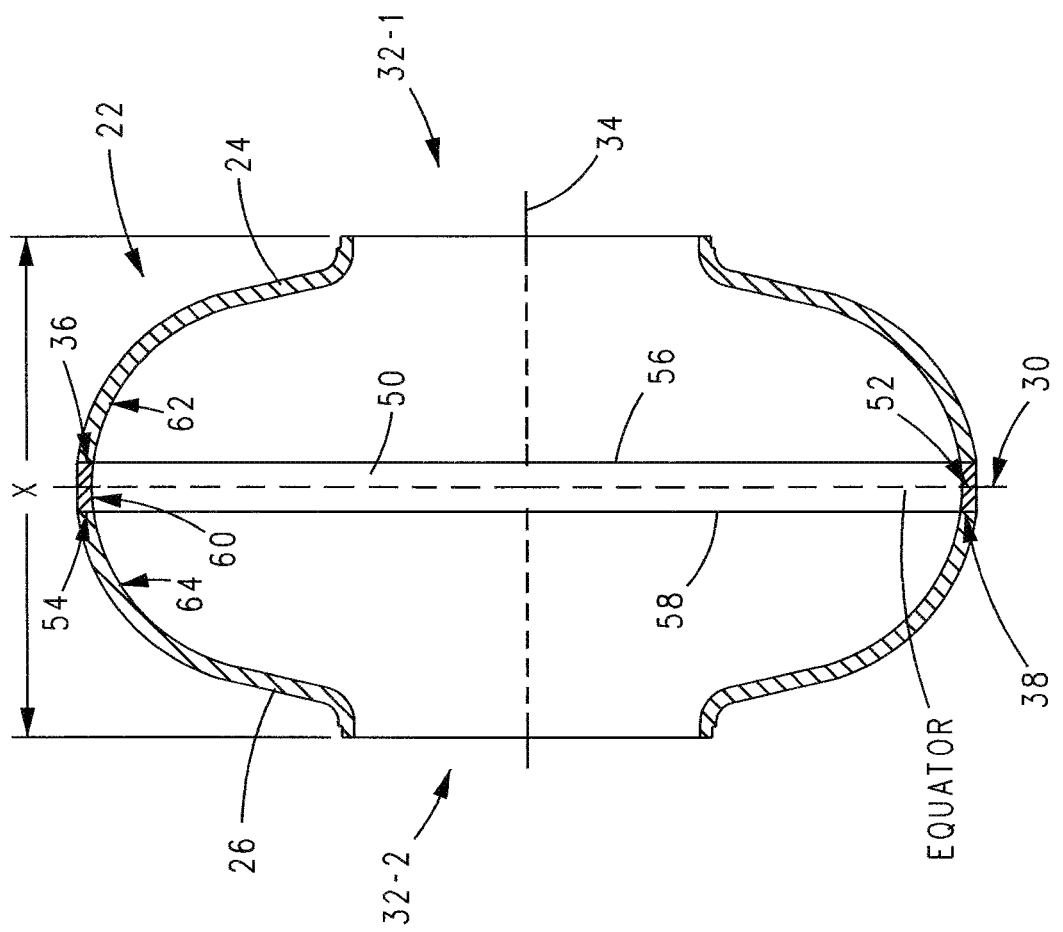
FIG. 3 is a cross-section of one preferred and non-limiting embodiment or example SRF cell according to the principles of the present invention.

With reference to FIG. 3, in one preferred and non-limiting embodiment or example of another example cell 22, a pipe section 50 includes a first pipe welding edge 52 welded to first cell welding edge 36 to form a first weld seam 56 and a second pipe welding edge 54 welded to second cell welding edge 38 to form a second weld seam 58. In this example, equator 30 is positioned between first weld seam 56 and second weld seam 58. In one preferred and non-limiting embodiment or example, equator 30 can be positioned at a 0° latitude coordinate of the body forming cell 22 between first and second irises 32-1 and 32-2. In an example, equator 30 can be positioned intermediate or halfway between first weld seam 56 and second weld seam 58. In an example, equator 30 can be positioned intermediate or halfway between irises 32-1 and 32-2.

In one preferred and non-limiting embodiment or example, in the example cell 22 shown in FIG. 3 (and in all of the example cells 22 described herein), an imaginary line extension of an interior surface 60 of pipe section 50 can be in alignment with interior surfaces 62 and 64 of first and second partial cells 24 and 26, respectively, To this end, in an example, the interior surface 60 of pipe section 50 can be straight or can have a curvature that aligns with the interior surfaces 62 and 64 which, proximate to weld seams 56 and 58, can be straight or have curvatures such that interior surfaces 60, 62, and 64 proximate first and second weld seams 56 and 58 can form a continuous or substantially continuous, smooth, and uninterrupted interior surface of cell 22 proximate first and second weld seams 56 and 58. In an example, it is envisioned that the interior surface of cell 22 may not be completely smooth at all points around the interior of cell 22 due to the presence of roughness and contamination caused by the welding operations used to form first weld seam 56 and second weld seam 58 and/or processes used to reduce said roughness and contamination, e.g., buffered chemical polishing or electro polishing. Similar comments regarding continuous or substantially continuous, smooth, and uninterrupted interior surface can also apply in respect of the interior surfaces of first- and second-partial cells 24 and 26 shown in FIG. 1 proximate weld seam 28 and the interior surfaces of pipe 40 and first- and second-partial cells 24 and 26 shown in FIG. 2 proximate first- and second-weld seams 46 and 48.

Figure 4:
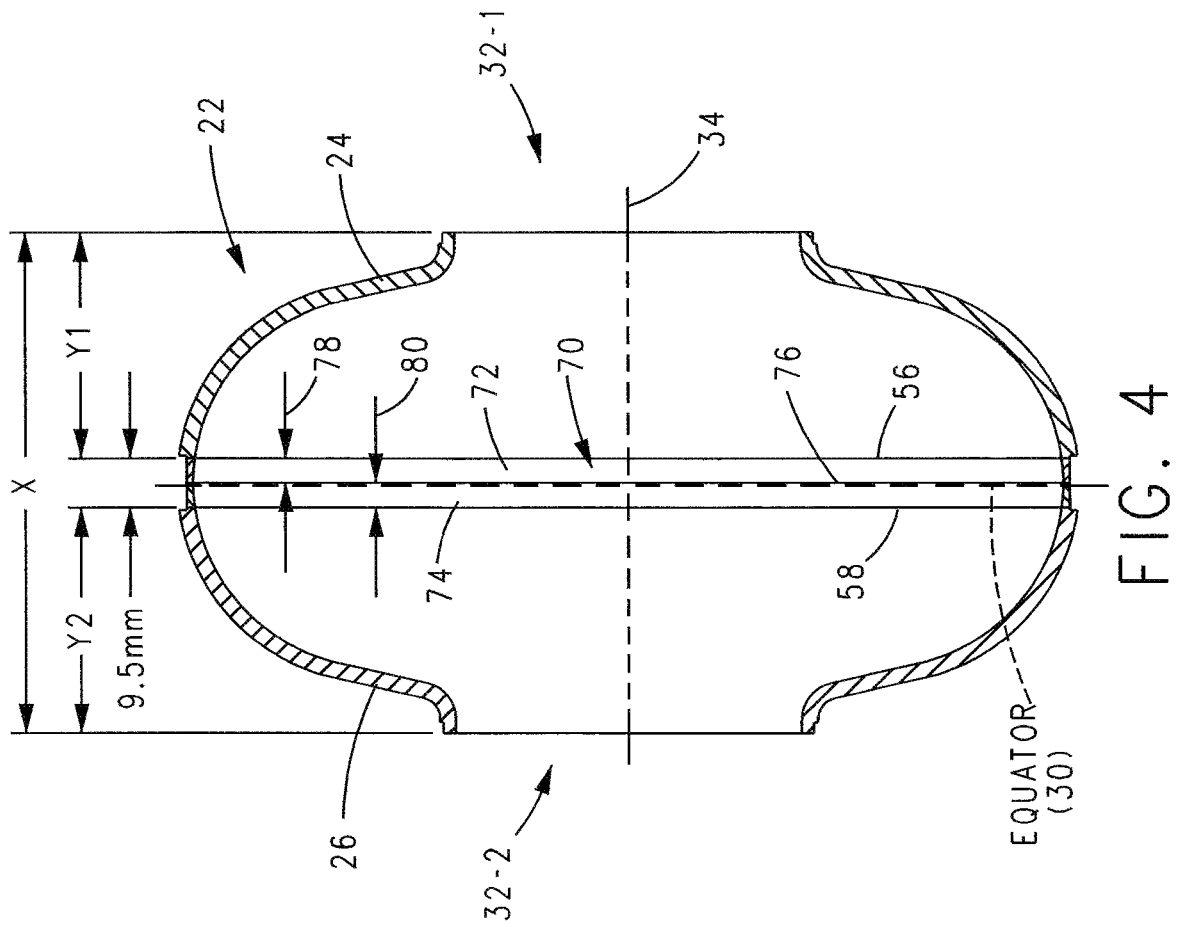
FIG. 4 is a cross-section of one preferred and non-limiting embodiment or example SRF cell according to the principles of the present invention.

With reference to FIG. 4, in one preferred and non-limiting embodiment or example, a pipe section 70 can be positioned between first-partial cell 24 and second-partial cell 26. In this example, pipe section 70 is formed by joining a first pipe section 72 and a second pipe 74 section together by welding to form a third weld seam shown by solid line 76.

In this example, first weld seam 56 and second weld seam 58 can be formed in the manner described above in connection with first and second weld seams 56 and 58 shown in FIG. 3, In the example shown in FIG. 4, first weld seam 56, second weld seam 58, and third weld seam 76 can be formed in any order. For example, first pipe section 72 and second pipe section 74 can initially be welded to first-partial cell 24 and second-partial cell 26 in any order forming first and second weld seams 56 and 58. Thereafter, third weld seam 76 can be formed joining first pipe section 72 and second pipe section 74, In another example, third weld seam 76 can be formed first to join first pipe section 72 and second pipe section 74, Thereafter, the pipe section 70 formed by welding together first pipe section 72 and second pipe section 74 can be welded to first and second partial cells 24 and 26 in any order to form weld seams 56 and 58. In an example, pipe section 70 and 72 can be half pipe sections In one preferred and non-limiting embodiment or example, third weld seam 76 can be offset from equator 30 of cell 22. Alternatively, third weld seam 76 can lie on equator 30. The widths 78 and 80 of first pipe section 72 and second pipe section 74 can be selected as deemed suitable and/or desirable depending on whether third weld seam 76 is to lie on equator 30 of cell 22 or if third weld seam 76 is to be spaced from equator 30 in a direction along axis 34 toward iris 32-1 or iris 32-2. In an example, the interior surfaces of first-partial cell 24, second-partial cell 26, first pipe section 72, and second pipe section 74 proximate weld seams 56, 58, and 76 can form a continuous or substantially continuous, smooth, and uninterrupted interior surface of cell 22.

Figure 5:
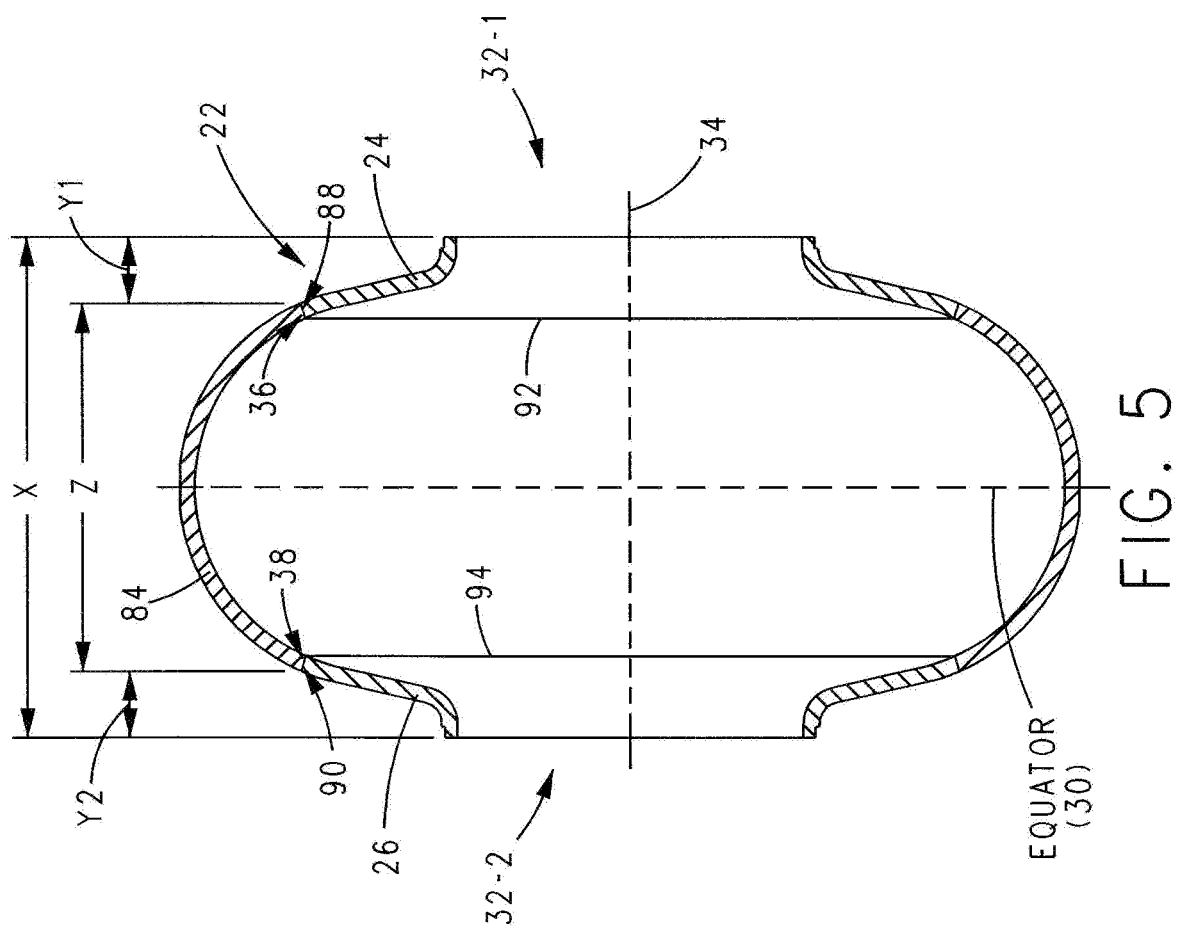
FIG. 5 is a cross-section of one preferred and non-limiting embodiment or example SRF cell according to the principles of the present invention.

Referring to FIG. 5, in one preferred and non-limiting embodiment or example, cell 22 can include a pipe section 84 having a width Z, as measured along axis 34, greater than 50% of a distance X between irises 32-1 and 32-2. In an example, first and second cell welding edges 36 and 38 of first and second partial cells 24 and 26 can be joined to respective first and second pipe welding edges 88 and 90 by welding to form first and second weld seams 92 and 94 proximate irises 32-1 and 32-2, respectively. In an example, distance Z between first and second weld seams 92 and 94 can be greater than 50%, greater than or equal to 60%, or greater than or equal to 70% of distance X between irises 32-1 and 32-2. In the illustrated example, distance Z is approximately 73% of distance X. In an example, distance Y1 from the exterior of weld seam 92 to iris 32-1 can be less than 5 mm, e.g., about 2.5 mm, with the minimum distance of Y1 determined by the width of weld seam 94, Similarly, distance Y2 from the exterior of weld seam 94 to iris 32-2 can, for example, be less than 5 mm, e.g., about 2.5 mm, with the minimum distance of Y2 determined by the width of weld seam 92. However, these percentages and dimensions are not to be construed in a limiting sense.

In one preferred and non-limiting embodiment or example, equator 30 of cell 22 is located between first and second weld seams 92 and 94. For example, equator 30 of cell 22 can be positioned halfway between first and second weld seams 92 and 94, In an example, equator 30 of cell 22 can be positioned halfway between irises 32-1 and 32-2. In an example, the interior surfaces of pipe section 84, first partial-cell 22 and second-partial cell 24 proximate weld seams 92 and 94 can form a continuous or substantially continuous, smooth, and uninterrupted interior surface of cell 22.

Figure 6:
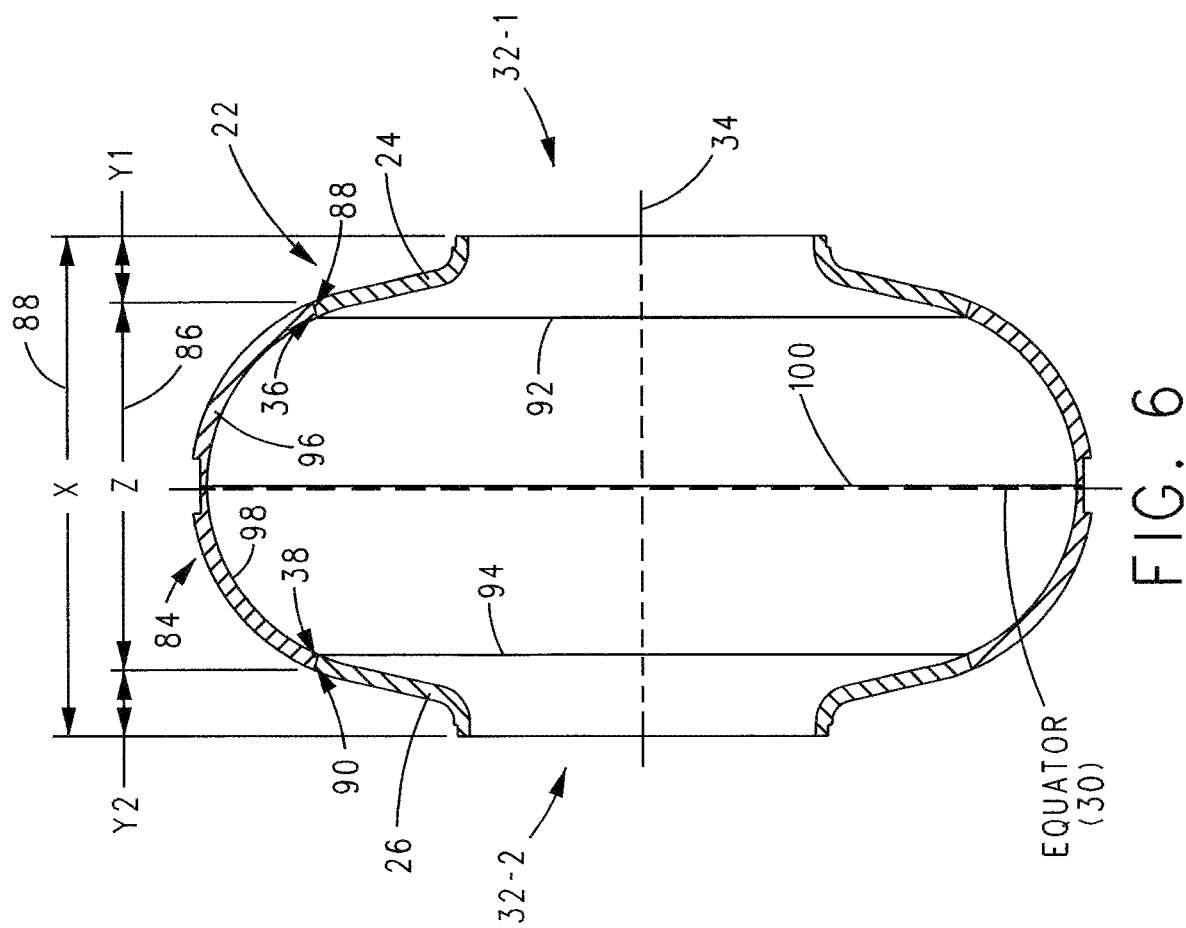
FIG. 6 is a cross-section of one preferred and non-limiting embodiment or example SRF cell according to the principles of the present invention.

With reference to FIG. 6, in one preferred and non-limiting embodiment or example, cell 22 in FIG. 6 is similar in most respects to cell 22 shown in FIG. 5 with the following exceptions. In FIG. 6, pipe section 84 is formed by welding a first- and second-partial pipe sections 96 and 98 together forming a third weld seam 100 which can reside proximate to or on equator 30. Weld seams 92, 94, and 100 can be formed in any order. In an example, proximate weld seams 92, 94, and 100, the interior surfaces of first- and second-partial pipe sections 96, 98, first partial cell 24 and second partial cell 26 can form a continuous or substantially continuous, smooth, and uninterrupted interior surface of cell 22.

In one preferred and non-limiting embodiment or example, it may be desirable to form third weld seam 100 before joining pipe section 84 to first-partial cell 24 and second-partial cell 26. For example, by forming third weld seam 100 before joining pipe section 84 to first partial cell 24 and second-partial cell 26, access to third weld seam 100 for the purpose of reducing roughness and contamination caused by the formation of third weld seam 100 can be more readily accomplished than would be the case if third weld seam 100 were formed following the formations of first and second weld seams 92 and 94. Similar comments apply in respect of forming third weld seam 76 of pipe section 70 in FIG. 4 before joining pipe section 70 to first partial cell 24 and second partial cell 26 by first and second weld seams 56 and 58.

In one preferred and non-limiting embodiment or example, in the foregoing examples where a pipe was included between first partial cell 24 and second partial cell 26, it may be desirable to first connect said pipe to one of the partial cells 24 or 26 via a weld seam, and thereafter, process the weld seam to reduce roughness and contamination prior to joining said pipe to the other partial cell. In this manner, access to the weld seam formed first can be enhanced.

Figure 7:
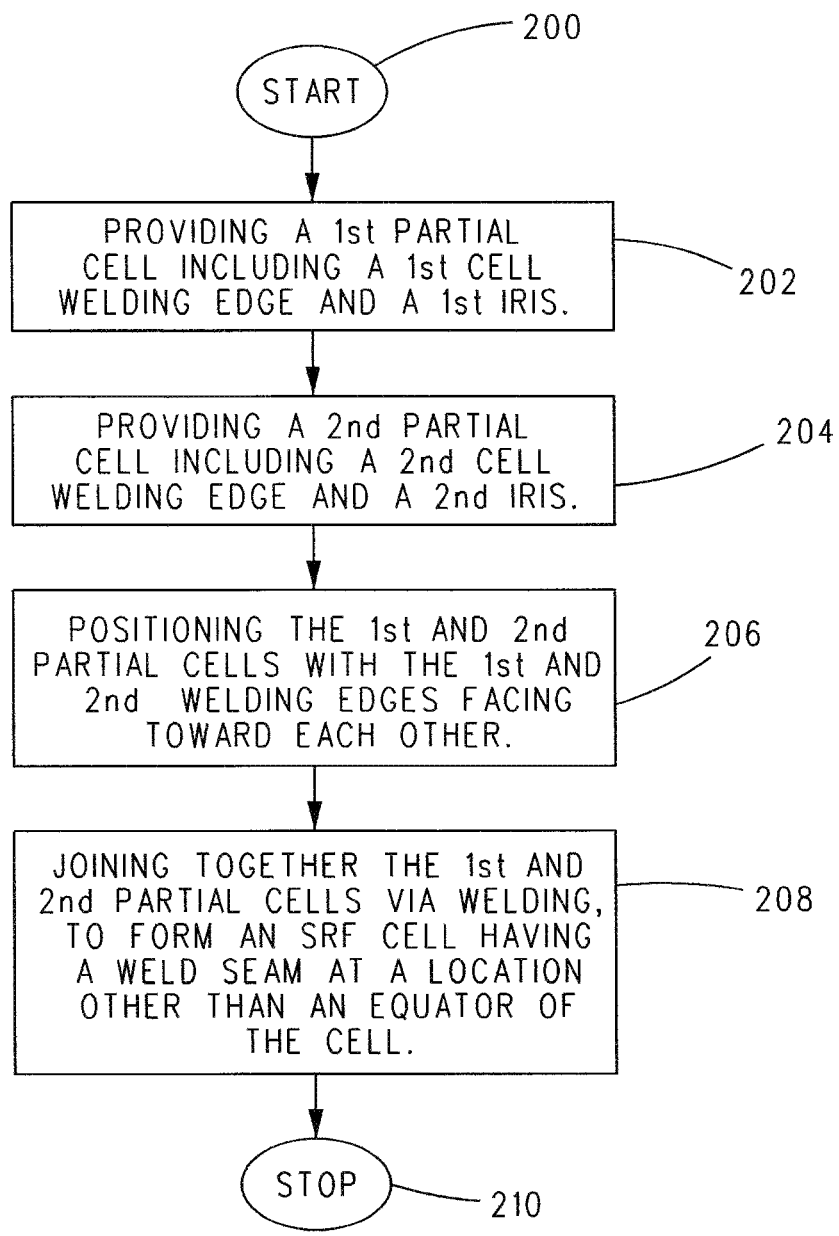
FIG. 7 is one preferred and non-limiting embodiment or example method of forming a SRF cell according to the principles of the present invention.

Referring to FIG. 7, in one preferred and non-limiting embodiment or example, a method of forming a SRF cell can include advancing from start step 200 to step 202 wherein a first partial cell is provided that includes a first cell welding edge and a first iris. The method then advances to step 204 wherein a second partial cell is provided that includes a second cell welding edge and a second iris. In step 206, the first and second partial cells are positioned with the first and second cell welding edges facing toward each other. In step 208 the first and second partial cells are joined via welding to form the SRF cell having a weld seam that is at a location other than an equator of the cell. The method can then advance to stop step 210. In one preferred and non-limiting embodiment or example, forming a weld seam by electron beam welding from the interior or the exterior of an SRF cell has been observed to require significant heat input to create the entire weld, leaving an undesirably rough surface on the interior of the SRF cell that can adversely affect the performance of the SRF cell. Accordingly, and in one preferred and non-limiting embodiment or example, instead of forming a weld seam by electron beam welding, the weld seam can be formed by laser welding with a beam of laser light. In one preferred and non-limiting embodiment or example, the weld seam can be formed by laser welding from both sides of a seam defined by abutting first and second objects together, e.g., abutting together a pair of welding edges, such as, without limitation, abutting together a pair of cell welding edges; abutting together a cell welding edge and a pipe welding edge; abutting together a pair of pipe welding edge, etc.

Figure 8A:
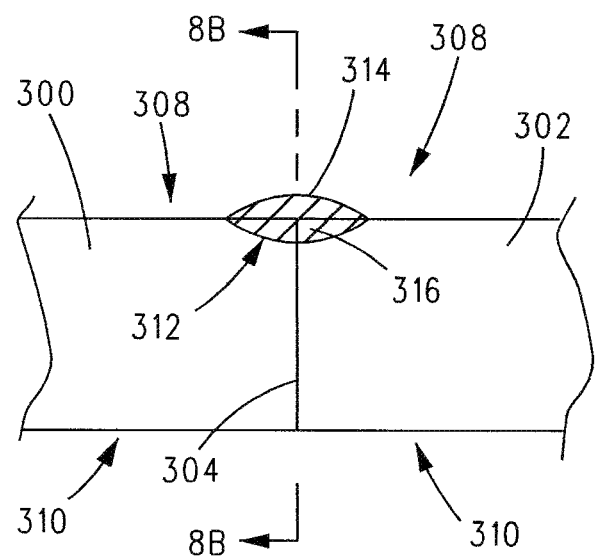
FIGS. 8A-8B are a front view and a cross-sectional view, taken along line 8B-8B in FIG. 8A, of one preferred and non-limiting embodiment or example of a laser conduction weld on one side of a seam formed by a pair of objects abutted together.
Figure 8B:
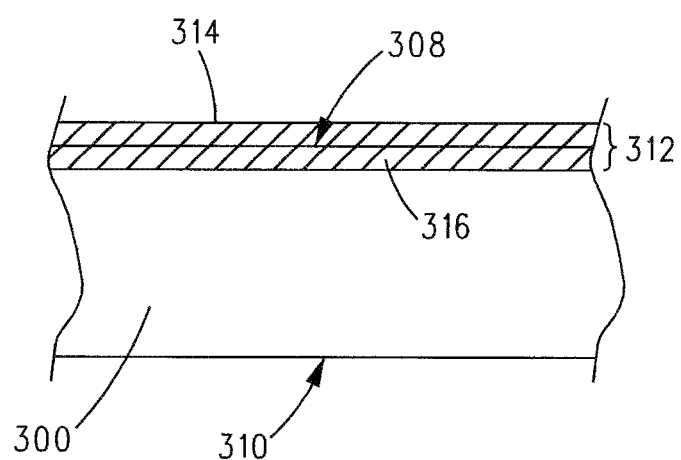

With reference to FIGS. 8A-8B, in one preferred and non-limiting embodiment or example, a first object 300 and a second object 302 can be abutted to form a common boundary or seam 304 that extends between first and second sides 308, 310 of seam 304 and, more particularly, between first and second sides 308, 310 of objects 300 and 302, In an example, first object 300 can be, without limitation, a pipe section, or a half or partial cell of an SRF cavity, and second object 302 can be, without limitation, a different pipe section, or a different half or partial cell of an SRF cavity. First side 308 can be one side of abutted objects 300, 302 and second side 310 can be the other side of abutted objects 300, 302. In an example, first side 308 can be at least part of an interior surface of an SRF cell and second side 310 can be at least part of an exterior surface of the SRF cell. However, this is not to be construed in a limiting sense since in one preferred and non-limiting embodiment or example, first and second objects 300, 302 can each be any suitable and/or desirable object made of any suitable and/or desirable material.

Moreover, in one preferred and non-limiting embodiment or example, the illustration of the first and second sides 308, 310 of first and second objects 300, 302 being planar to each other is not to be construed in a limiting sense. For example, first side 308 of first object 300 and first side 308 of second object 302 can be offset (non-planar), e.g., with a step therebetween, and/or can have any suitable and/or desirable shapes, e.g., both curved, one curved and one planar, and the like. Similarly, second side 310 of first object 300 and second side 310; of second object 302 can be offset (non-planar), e.g., with a step therebetween, and/or can have any suitable and/or desirable shape, e.g., both curved, one curved and one planar, and the like.

In one preferred and non-limiting embodiment or example, once seam 304 is formed by the abutment together of first and second objects 300, 302 to define seam 304 that extends between first and second sides 308, 310 of objects 300 and 302, a first, conduction weld 312 can be formed by laser welding first side 308 of seam 304 and, more particularly, laser conduction welding the first sides 308 of first and second objects 300, 302 proximate seam 304. The first, conduction weld 312 can have a relatively smooth exposed surface 314 that rises above side 308 of seam 304 and a body 316 that extends between surface 314 and second side 310. In an example, body 316 can extend less than 25% of the distance from first side 308 to second side 310. The shape of first, conduction weld 312 shown in the figures is for illustration purposes only and is not to be construed in a limiting sense.

Figure 9A:
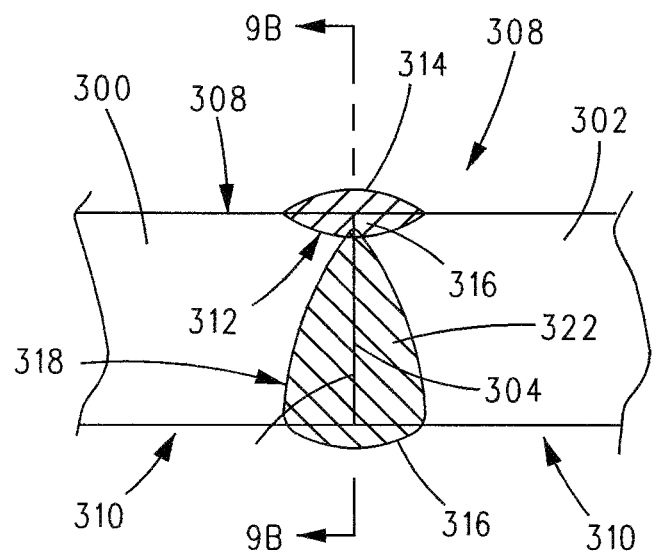
FIGS. 9A-9B are a front view and a cross-sectional view, taken along line 9B-9B in FIG. 9A, of one preferred and non-limiting embodiment or example of a laser keyhole weld on the other side of the seam partially overlapping the conduction weld of FIGS. 8A-8B.
Figure 9B:
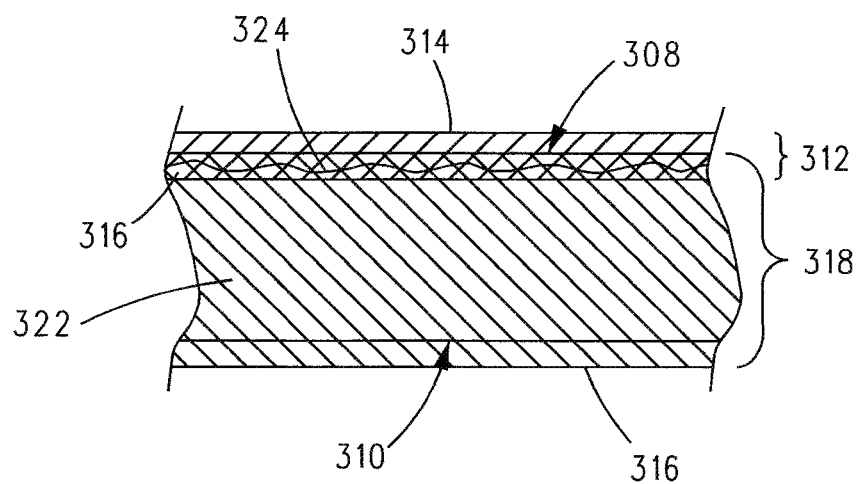

With reference to FIGS. 9A-9B and with continuing reference to FIGS. 8A-8B, in one preferred and non-limiting embodiment or example, once first, conduction weld 312 is formed, a second, keyhole weld 318 can then be formed by laser welding second side 310 of seam 304 and, more particularly, laser keyhole welding the second sides 310 of first and second objects 300, 302 proximate seam 304. The second, keyhole weld 318 can have a relatively porous exposed surface 316 and a relatively porous body 322 that extends between surface 316 and surface 314 of conduction weld 312. In an example, body 322 can extend greater than 75% of the distance from second side 310 to first side 308. The shape of second, keyhole weld 318 shown in the figures is for illustration purposes only and is not to be construed in a limiting sense.

In one preferred and non-limiting embodiment or example, once first, conduction weld 312 and second, keyhole weld 318 are formed on opposite sides thereof, seam 304 can, also or alternatively, be referred to as weld seam 304.

In one preferred and non-limiting embodiment or example, as is known in the art, in laser conduction mode welding, the power density is great enough to cause the material, e.g., niobium, of first and second objects 300, 302 to melt. Weld penetration is achieved by the heat of the laser conducting down into the material from side 308. In an example, laser conduction welding is accomplished by pulsed-laser welding in the millisecond pulse duration range. The depth of weld penetration is controlled, in part, by the duration of the pulse. The longer the pulse, the more time heat has to "conduct" into the material(s) forming first and second objects 300, 302. In laser conduction welding, the conduction weld 312 is typically wider than deep, as shown, for example, in FIG. 8A.

Figure 10A:
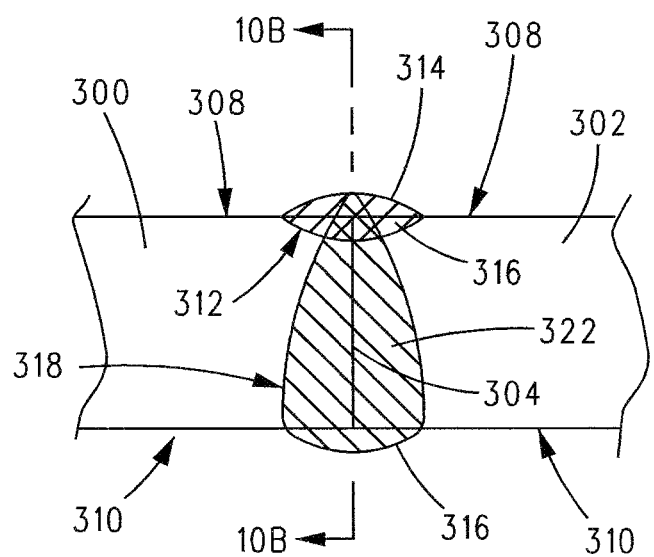
FIGS. 10A-10B are a front view and a cross-sectional view, taken along line 10B-10B in FIG. 10A, of one preferred and non-limiting embodiment or example of a laser keyhole weld on the other side of the seam substantially overlapping the conduction weld of FIGS. 8A-8B.
Figure 10B:
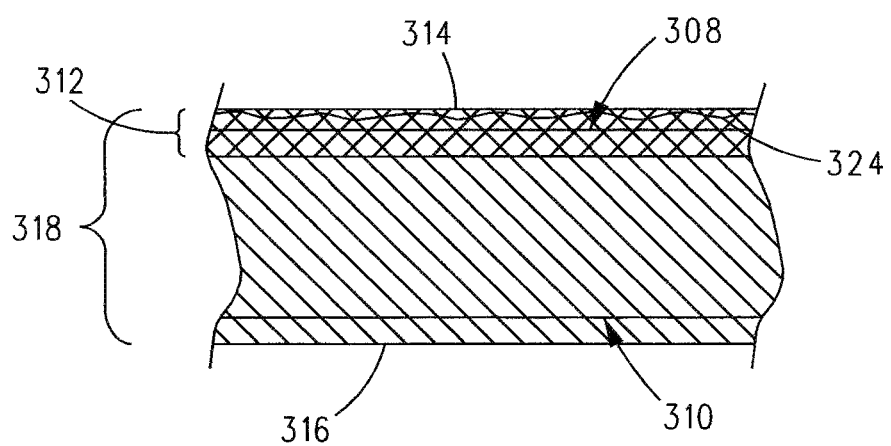
Figure 11A:
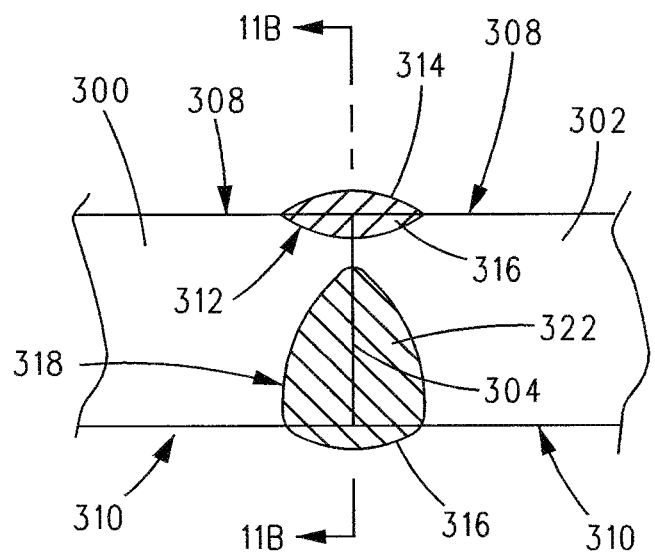
FIGS. 11A-11B are a front view and a cross-sectional view, taken along line 11B-11B in FIG. 11A, of one preferred and non-limiting embodiment or example of a laser keyhole weld on the other side of the seam not overlapping (spaced from) the conduction weld of FIGS. 8A-8B.
Figure 11B:
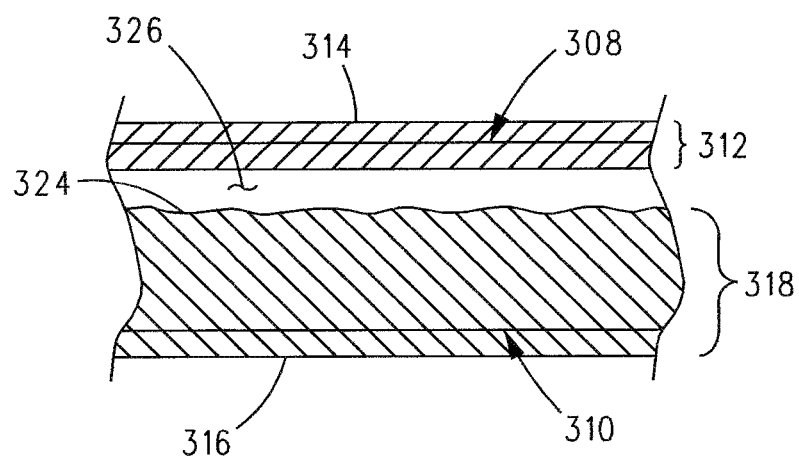

In one preferred and non-limiting embodiment or example, as is known in the art, in laser keyhole welding, heating achieves weld penetration in a different way than conduction welding. Specifically, during laser keyhole welding, the power density is great enough to cause the metal to go beyond just melting—it vaporizes. The vaporized metal creates expanding gas that pushes outward creating the keyhole or tunnel from side 310 into the depth of the weld. As the beam of laser light moves along the side 310 of seam 304, e.g., the laser beam in FIG. 9A moves normal to the page and moves laterally right-to-left, or vice versa, in FIG. 9B, the keyhole follows and creates a deep and narrow weld. As long as the laser power is great enough and the travel speed of the laser on the side 310 of seam 304 is not excessive, the keyhole will remain open proximate the laser beam. Keyhole welding creates a strong, deep weld, but at the cost of increased porosity, spattering, and depth variation versus a conduction weld. A non-limiting example of this depth variation is shown by wavy line 324 in FIGS. 9B, 10B, and 11B.

In one preferred and non-limiting embodiment or example, where each of first and second objects 300, 302 are portions of an SRF cell, e.g., a pipe section, a partial cell, a half cell, etc., side 308, which is laser conduction welded to form conduction weld 312, can, in an example, be an interior surface of the finished SRF cell (which interior surface can desirably be continuous or substantially continuous, smooth, and uninterrupted), and side 310, which is laser keyhole welded to form keyhole weld 318 can, in an example, be an exterior surface of the finished SRF cell. However, this is not to be construed in a limiting sense.

In one preferred and non-limiting embodiment or example, the depth of keyhole weld 318 can be tuned or selected as desired. For example, as shown in FIGS. 9A-9B, keyhole weld 318 can intersect body portion 316 of conduction weld 312 between first and second sides 308, 310. In another example shown in FIGS. 10A-10B, some or all of keyhole weld 318 can intersect body portion 316 of conduction weld 312 between surface 314 of conduction weld 312 and first side 308. As shown by line 324 in FIG. 10B, in one preferred and non-limiting embodiment or example, some or all of keyhole weld 318 can extend to surface 314 of conduction weld 312. In yet another example shown in FIGS. 11A-11B, all of keyhole weld 318 can be spaced from conduction weld 312 by a gap 326 of the material(s) forming at least one of first and second objects 300, 302. In one preferred and non-limiting embodiment or example, it is envisioned that a single continuous keyhole weld 318 can have some or all of the variations of depths of the keyhole welds 318 shown by lines 324 in FIGS. 9B, 10B, and 11B.

Figure 12A:
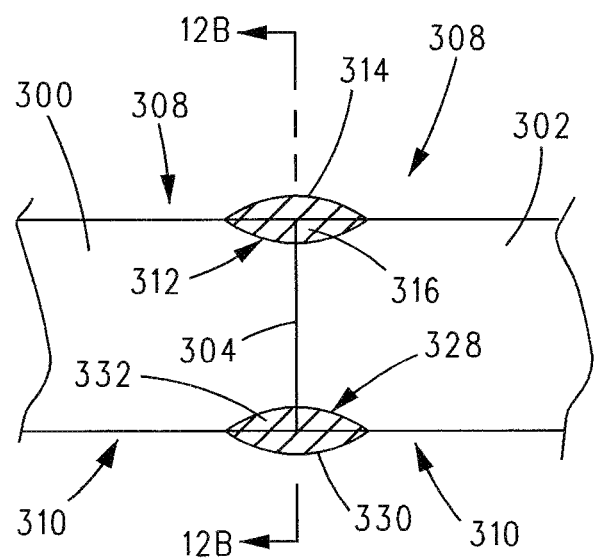
FIGS. 12A-12B are a front view and a cross-sectional view, taken along line 12B-12B in FIG. 12A, of one preferred and non-limiting embodiment or example of a laser conduction weld on the other side of the seam of the conduction weld of FIGS. 8A-8B.
Figure 12B:
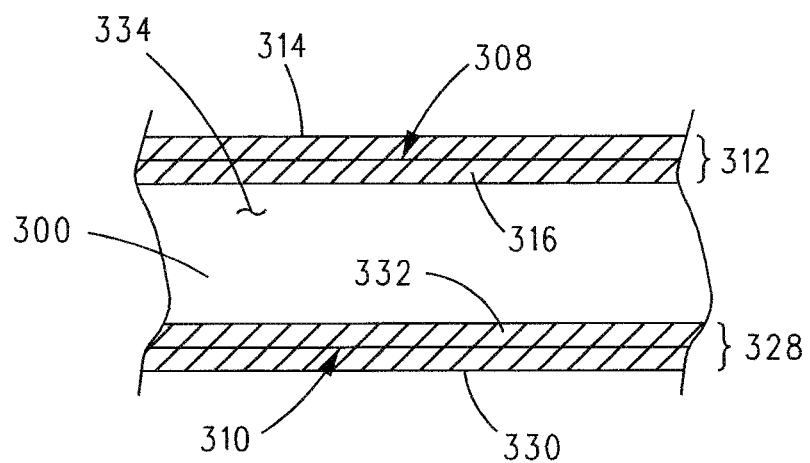

With reference to FIGS. 12A-12B, in one preferred and non-limiting embodiment or example, before or after first conduction weld 312 is formed, a second conduction weld 328 can be formed by laser welding second side 310 of seam 304 and, more particularly, laser conduction welding the second sides 310 of first and second objects 300, 302 proximate seam 304. The order of forming first conduction weld 312 and a second conduction weld 328 is not to be construed in a limiting sense.

Like first conduction weld 312, second conduction weld 328 can have a relatively smooth exposed surface 330 that rises above side 310 of seam 304 and a body 332 that extends between surface 330 and first side 308. First conduction weld 312 and second conduction weld 328 can be separated by a gap 334 of the material(s) forming at least one of first and second objects 300, 302. The shape of second conduction weld 318 shown in the figures is for illustration purposes only and is not to be construed in a limiting sense.

Figure 13A:
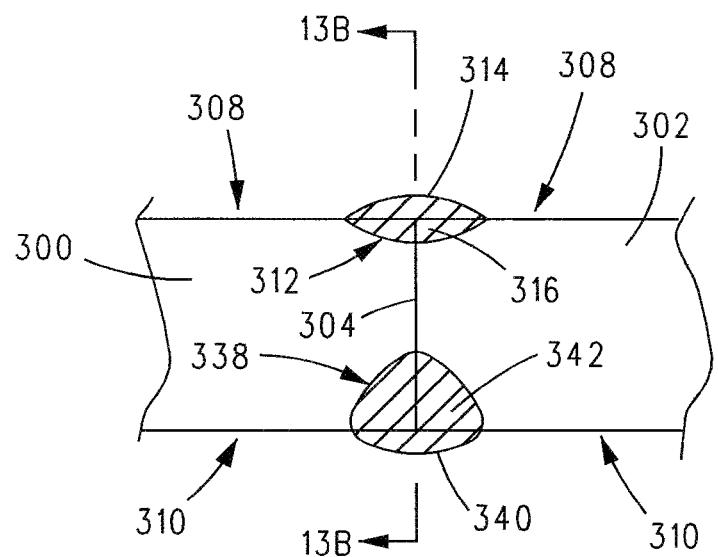
FIGS. 13A-13B are a front view and a cross-sectional view, taken along line 13B-13B in FIG. 13A, of one preferred and non-limiting embodiment or example of a laser transition weld on the other side of the seam of the conduction weld of FIGS. 8A-8B.
Figure 13B:
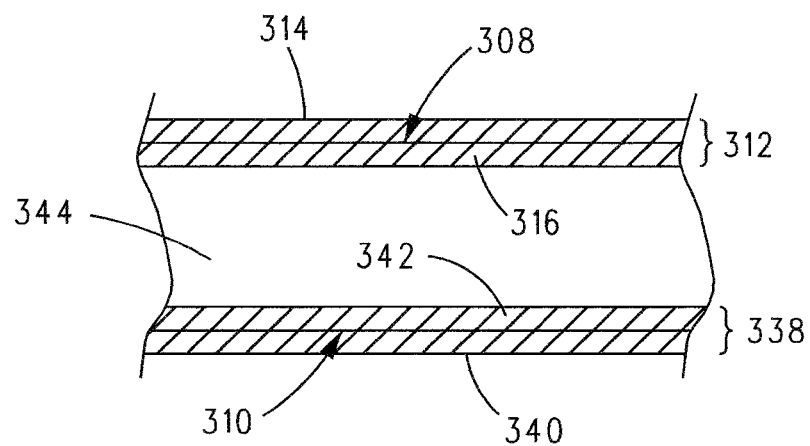

With reference to FIGS. 13A-13B, in one preferred and non-limiting embodiment or example, before or after first conduction weld 312 is formed, a second, transition weld 338 can be formed by laser welding second side 310 of seam 304 and, more particularly, laser transition welding the second sides 310 of first and second objects 300, 302 proximate seam 304. The order of forming first conduction weld 312 and a second transition weld 338 is not to be construed in a limiting sense.

As is known in the art, a transition weld, like transition weld 338, is formed at a power density of the laser beam between, e.g., intermediate, the power density of the laser beam forming a conduction weld and the power density of the laser beam forming a keyhole weld. The laser beam forming a transition weld has more penetration than laser beam forming a conduction weld and forms a keyhole that has a shallow penetration. In an example, a typical transition weld has an aspect ratio (depth/width) of around 1. However, this is not to be construed in a limiting sense. Conduction welds, keyhole welds, and transition welds are each known in the art.

Transition weld 338 can have an exposed surface 330 that rises above side 310 of seam 304 and a body 342 that extends between surface 330 and first side 308. The surface of transition weld 338 can be relatively smooth or porous depending on the power density used to form transition weld 338. Conduction weld 312 and transition weld 338 can be separated by a gap 344 of the material(s) forming at least one of first and second objects 300, 302. The shape of transition weld 338 shown in the figures is for illustration purposes only and is not to be construed in a limiting sense.

Figure 14:
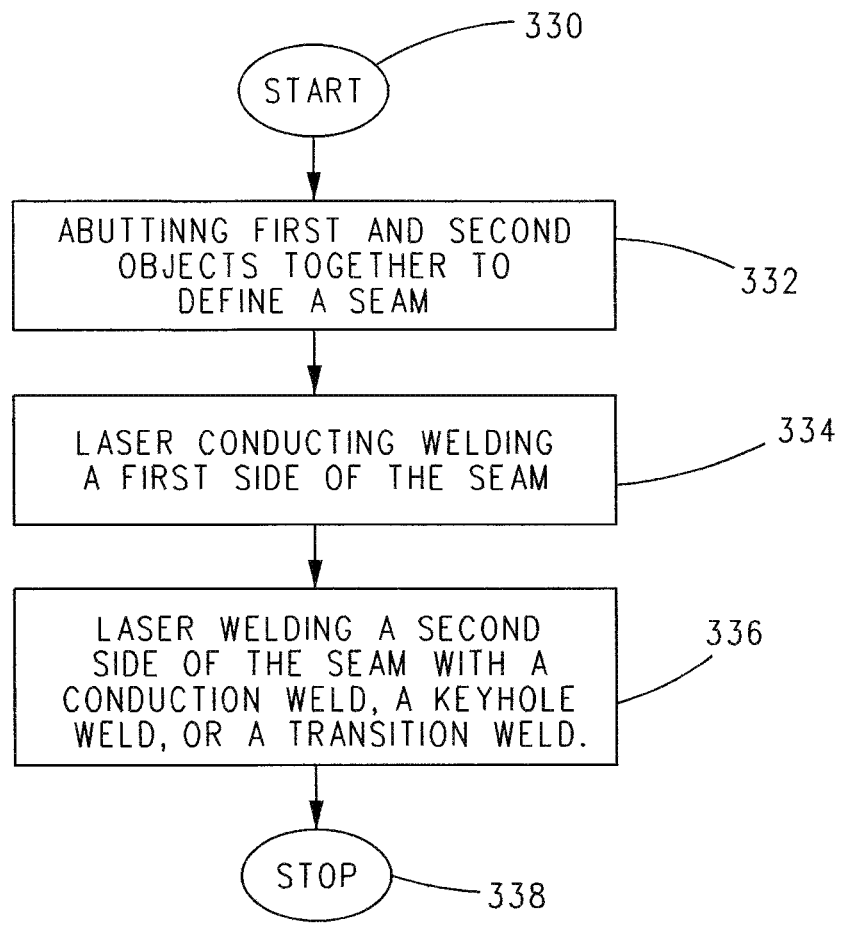
FIG. 14 is one preferred and non-limiting embodiment or example method of laser welding first and second objects together according to the principles of the present invention.
Figure 15:
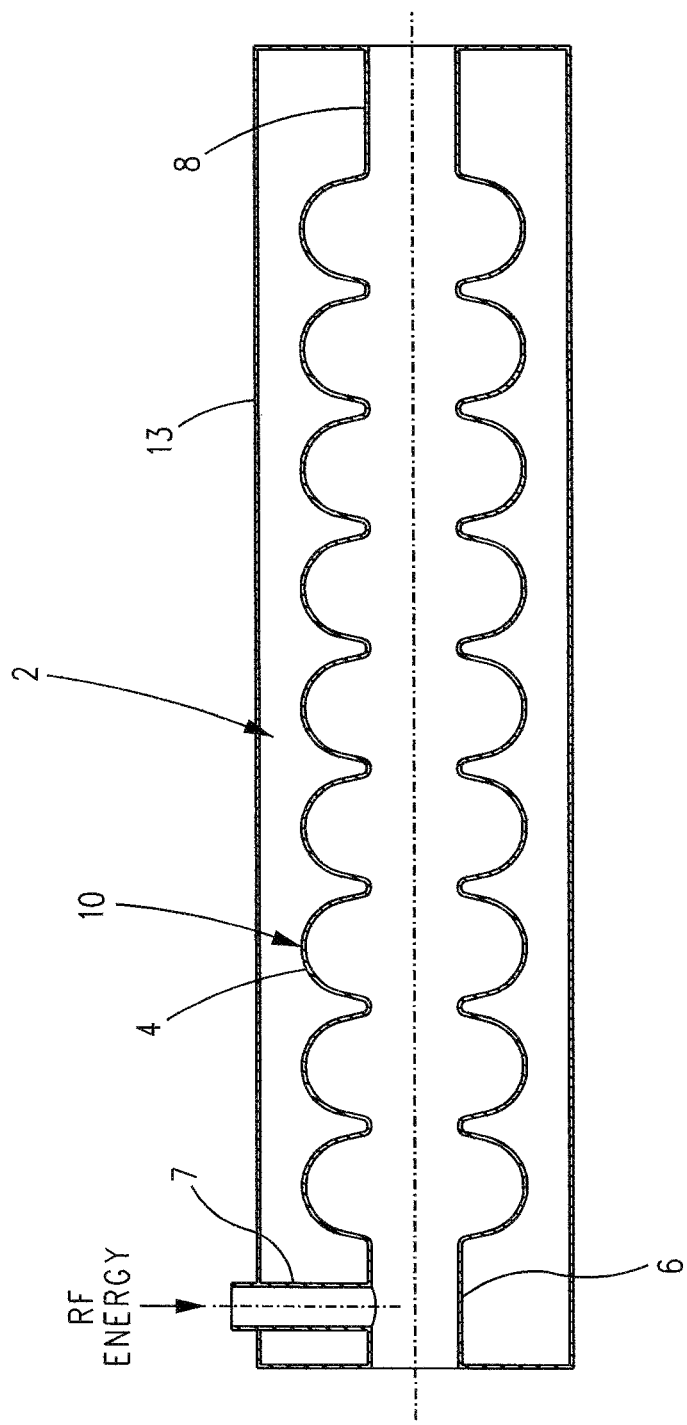
FIG. 15 is an isolated view of a prior art superconducting radio frequency (SRF) cavity including a plurality of prior art SRF cells.
Figure 16:
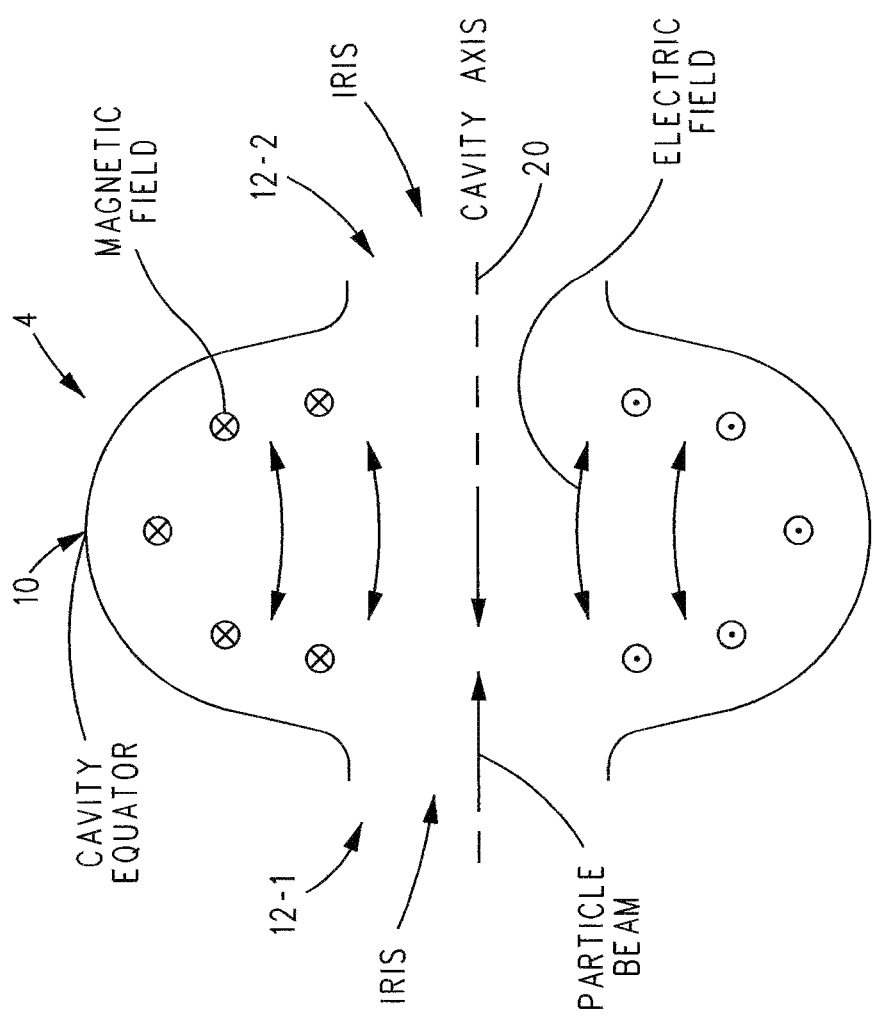
FIG. 16 is a generalized schematic drawing of a cross-section of a single prior art SRF cell that can be used in the SRF cavity shown in FIG. 15.
Figure 17:
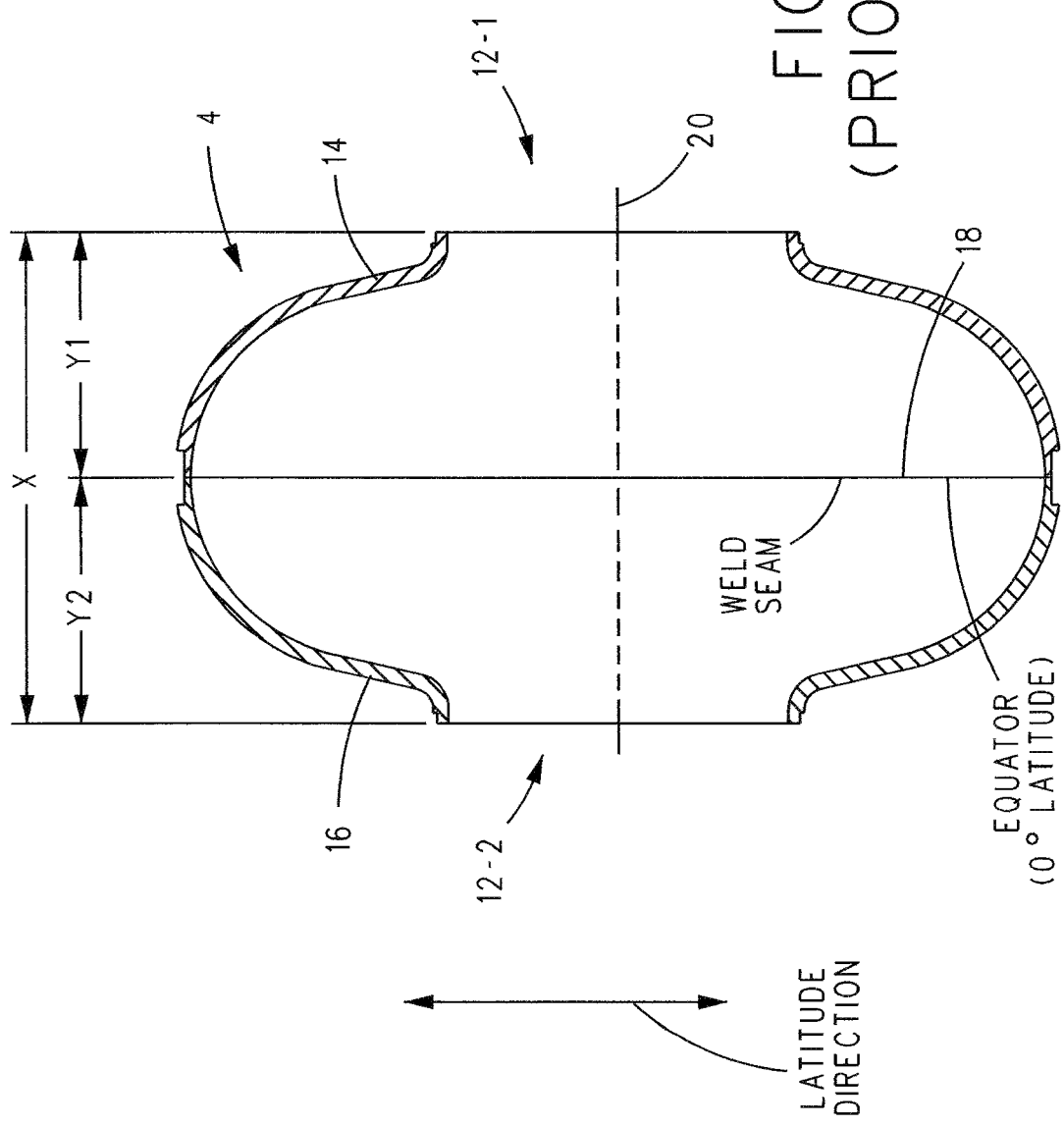
FIG. 17 is an example cross-section of a single prior art SRF cell shown in FIG. 15.

With reference to FIG. 14, in one preferred and non-limiting embodiment or example, a method of laser welding first and second objects 300, 302 together can include advancing from a start step 330 to step 332 wherein the first and second objects 300, 302 can be abutted together to define a seam 304. The method can then advance to step 334 where a first side 308 of the seam 304 is laser conduction welded to form a conduction weld 312. The method can then advance to step 336 where a second side 310 of the seam 304 is laser welded to form a conduction weld 328, a keyhole weld 318, or a transition weld 338. The method can then advance to stop step 338.

In one preferred and non-limiting embodiment or example, weld seam 304, including first, conduction weld 312 on first side 308 and a second weld 318, 328, or 338 on second side 310, can be used for any weld seam described above in connection with FIGS. 1-7 and 13-15.

As can be seen, disclosed here in is a method for producing a superconducting radio frequency (SRF) cell 22 defined by a hollow body having first and second irises 32-1 and 32-2 spaced from each other along an axis 34 of the body and a cell equator 30 at a 0° latitude coordinate of the body between the first and second irises 32-1 and 32-2. The method includes providing a first-partial cell 24 including a first cell welding edge 36 and a first iris 32-1 on opposite sides of the first-partial cell 24, and providing a second-partial cell 26 including a second cell welding edge 38 and a second iris 32-2 on opposite sides of the second-partial cell 26. The first- and second-partial cells 24, 26 are positioned with the first and second cell welding edges 36, 38 facing toward each other. The first- and second-partial cells 24, 26 are welded together, thereby forming a weld seam 28, 304 at a latitude other than the equator 30. The step of welding can comprise forming a first weld 312 and a second weld 318, 328, or 338 on respective first and second opposite sides 308, 310 of at least one of the cell welding edges 36, 38.

The first weld 312 can be a conduction weld. The second weld 318, 328, or 338 can be a conduction weld, a keyhole weld, or a transition weld.

The weld seam 28, 304 can be located along the axis 34 toward the first or second iris 32-1 or 32-2 ≥5 mm from the equator 30.

The weld seam 28, 304 can be formed by welding the first and second cell welding edges 36, 38 together.

The method can further include positioning between the first- and second-partial cells 24, 26 a pipe section 40 that includes first and second pipe welding edges 42, 44 facing the respective first and second cell welding edges 36, 38.

The first and second pipe welding edges 42, 44 can be welded to the respective first and second cell welding edges 36, 38. The weld seam 28, 46, 304 can be formed by welding the first pipe welding edge 42 and the first cell welding edge 36. A second weld seam 48, 304 can be formed by welding the second pipe welding edge 44 and the second cell welding edge 38. Each weld seam 28, 46, 48, can be formed by a first weld 312 and a second weld seam 318, 328, or 338 on respective first and second opposite sides 308, 310 of at least one of the pipe welding edges 42, 44.

The second weld seam 48, 304 can be positioned on the equator 30.

The weld seam 56, 304 and the second weld seam 58, 304 can be positioned on opposite sides of the equator 30.

The method can include welding first- and second-partial pipe sections 72, 74 together to form the pipe section 70 including a third weld seam 76, 304 which, following step (d), is positioned on or proximate to the equator 30.

Each first weld seam 46, 56, 304 can be a conduction weld and each second weld seam 48, 58, 304 can be a conduction weld, a keyhole weld, or a transition weld.

The first side 308 can be an interior surface of the at least one partial cell. The second side 310 can be an exterior surface of the at least one partial cell. The step of welding can comprise laser welding.

Also disclosed is a superconducting radio frequency (SRF) cell 22 comprising a body defining a hollow cavity having first and second opposite ends. A first iris 32-1 is at a first end of the body and a second iris 32-2 is at a second end of the body. The body defines an axis 34 that extends between the first and second irises 32-1 and 32-2 and an equator 30 around the axis 34 between the first and second irises. The body includes at least a first weld seam 28, 46, 56, 304 around the axis 34 at a location on the body spaced from the equator 30, Each weld seam can extend through the body and can have opposite sides terminating proximate an interior and an exterior of the body, Each weld seam can comprise a first weld and a second weld on the opposite sides of the weld seam.

The first weld can be a conduction weld. The second weld can be a conduction weld, a keyhole weld, or a transition weld.

The body can include a second weld seam 58 around the axis 34. The first and second weld seams 56 and 58 can be on opposite sides of the equator.

The first weld can be on the interior of the body. The second weld can be on an exterior of the body.

The body can comprise first and second partial cells 24, 26 having different shapes.

The body can include a pipe section 40 between the first and second partial cells.

The body can include second and third weld seam 56, 58 joining the pipe section to the first and second partial cells.

The first and third weld seams 92, 94 can be proximate the first and second irises 32-1 and 32-2. The first weld seam 92 can be ≥5 mm from the first iris 32-1. The third weld seam 94 can be ≥5 mm from the second iris 32-2.

Also disclosed is a method comprising: abutting first and second objects together thereby defining a seam having first and second sides on opposite sides of the objects; laser welding the first and second objects together along the seam from the first side of the seam with a conduction weld; and laser welding the first and second objects together along the seam from the second side of the seam with a conduction weld, a keyhole weld, or a transition weld.

Each object can be a part of a body of a superconducting radio frequency cell. The first side of the seam can be formed on the interior of the body. The second side of the seam can be formed on the exterior of the body.

As can be seen, the present invention overcomes, at least partially, the problem of having the electric field or magnetic field with the largest variation on the region of the cell (weld seam) with the greatest sensitivity to the variation. While moving one or more weld seams to different areas of the cell increases costs and complexity of production, it reduces the negative impact of one or more of the weld seams on the performance of the cell. In an example, the impact of a weld seam on a cell performance can be minimized by locating the weld seam at the combined minimum of the electric field and the magnetic field, weighted for the impact that the weld seam would have on the limit of the cell performance.

In addition to increasing the upper bounds of cell performance, moving one or more weld seams off of the equator of the cell opens up a number of processing options to take advantage of the greater accessibility of the center of the cell on or proximate to the equator. For example, prior to completing/forming any or all of the weld seams for each example cell 22 shown in FIGS. 1-6, one or more interior surfaces of first- and second-partial cells 24, 26, any pipe, any pipe section, and/or any combination thereof can be subject to electro polishing, and/or post weld machining, and/or physical vapor deposition of, for example, niobium, for example, without limitation, where partial cells 24, 26, any pipe, any pipe section, and/or any combination thereof is/are formed of a material other than niobium.

Moreover, the first, conduction weld on the interior surface (or first side) of the cell has a smooth weld surface with little, often no, porosity. The second weld, e.g., a conduction weld, a keyhole weld, or a transition weld, on the exterior surface (second side) of the cell can create a strong, deep weld and an overall strong weld seam that can enable the cell to better stand the rigorous use in a SRF cavity. Where the second weld is a keyhole weld, by first forming the conduction weld on the interior surface, the weld seam can be sealed against spatter from the subsequent keyhole weld. The keyhole weld can then be made on the exterior surface, whereupon the depth of the keyhole weld can approach and, in an example, intersect the rear or interior depth of the conduction weld without intersecting the interior surface (or first side) of the cell. In an example, the keyhole weld can fully overlap the conduction weld, partially overlap the conduction weld, or can be spaced from the conduction weld.

Where the second weld is a conduction weld or a transition weld, the first and second welds can be formed in any desirable order.

In one preferred and non-limiting embodiment or example, the combination of a conduction weld on one side of a seam formed by abutting two objects and forming a conduction weld, a keyhole weld, or a transition weld on the other side of the seam can be used in connection with any suitable and/or desirable objects other than the partial cells, pipes, or pipe sections described herein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for producing a superconducting radio frequency (SRF) cell defined by a hollow body having first and second irises spaced from each other along an axis of the body and a cell equator at a 0° latitude coordinate of the body between the first and second irises, the method comprising:
   (a) providing a first-partial cell including a first cell welding edge and a first iris on opposite sides;
   (b) providing a second-partial cell including a second cell welding edge and a second iris on opposite sides;
   (c) positioning the first- and second-partial cells with the first and second cell welding edges facing toward each other and with the first and second irises proximate each other with no intervening iris positioned between the first and second irises; and
   (d) welding the first- and second-partial cells together, thereby forming a weld seam at a latitude other than the equator, wherein the step of welding comprises forming first and second welds on respective first and second opposite sides of at least one of the cell welding edges.

2. The method of claim 1, wherein:
   the first weld is a conduction weld; and
   the second weld is a conduction weld, a keyhole weld, or a transition weld.

3. The method of claim 1, wherein the weld seam is formed by abutting and welding the first and second cell welding edges together.

4. The method of claim 1, wherein:
   step (c) further includes positioning between the first- and second-partial cells a pipe section that includes first and second pipe welding edges facing the respective first and second cell welding edges; and
   step (d) further includes welding the first and second pipe welding edges to the respective first and second cell welding edges, wherein the weld seam is formed by welding the first pipe welding edge and the first cell welding edge, and wherein a second weld seam is formed by welding the second pipe welding edge and the second cell welding edge, wherein each weld seam is formed by first and second welds on respective first and second opposite sides of at least one of the pipe welding edges.

5. The method of claim 4, wherein the second weld seam is positioned on the equator.

6. The method of claim 4, wherein the weld seam and the second weld seam are positioned on opposite sides of the equator.

7. The method of claim 6, further including: welding first- and second-partial pipe sections together to form the pipe section including a third weld seam which, following step (d), is positioned on the equator.

8. The method of claim 4, wherein each first weld is a conduction weld and each second weld is a conduction weld, a keyhole weld, or a transition weld.

9. The method of claim 1, wherein:
   the first side is an interior surface of the at least one partial cell; and
   the second side is an exterior surface of the at least one partial cell.

10. The method of claim 1, wherein the step of welding comprises laser welding.

11. A superconducting radio frequency (SRF) cell comprising:

a body defining a hollow cavity having first and second opposite ends;
a first iris at a first end of the body; and
a second iris at a second end of the body, wherein the first and second irises are proximate each other with no intervening iris positioned between the first and second irises and the body defines an axis that extends between the first and second irises and an equator around the axis between the first and second irises, wherein the body includes at least a first weld seam around the axis at a location on the body spaced from the equator, wherein each weld seam extends through the body and has opposite sides terminating proximate an interior and an exterior of the body, and each weld seam comprises a first weld and a second weld on the opposite sides of the weld seam.

12. The SRF cell of claim 11, wherein:
the first weld is a conduction weld; and
the second weld is a conduction weld, a keyhole weld, or a transition weld.

13. The SRF cell of claim 11, wherein:
the body includes a second weld seam around the axis; and
the first and second weld seams are on opposite sides of the equator.

14. The SRF cell of claim 11, wherein:
the first weld is on the interior of the body; and
the second weld is on the exterior of the body.

15. The SRF cell of claim 13, wherein the body comprises first and second partial cells having different shapes.

16. The SRF cell of claim 15, wherein the body includes a pipe section between the first and second partial cells.

17. The SRF cell of claim 16, wherein:
the body includes second and third weld seams joining the pipe section to the first and second partial cells.

18. The SRF cell of claim 17, wherein:
the first and third weld seams are proximate the first and second irises;
the first weld seam is $\geq 5$ mm from the first iris; and
the third weld seam is $\geq 5$ mm from the second iris.

* * * * *